(12) United States Patent
Bodduru et al.

(10) Patent No.: US 9,408,245 B2
(45) Date of Patent: Aug. 2, 2016

(54) SYSTEMS AND METHODS FOR ACQUIRING SERVICE USING MULTIPLE CHANNELS

(71) Applicant: QUALCOMM Incorporated, San Diego, CA (US)

(72) Inventors: Appala Naga Raju Bodduru, Hyderbad (IN); Venkata Appala Naidu Babbadi, Hyderbad (IN); Kondal Reddy Narlengi, Hyderbad (IN); Rahul Gupta, Hyderbad (IN)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/067,636

(22) Filed: Oct. 30, 2013

(65) Prior Publication Data

US 2015/0119026 A1 Apr. 30, 2015

(51) Int. Cl.
*H04W 76/02* (2009.01)
*H04W 48/16* (2009.01)
*H04W 88/06* (2009.01)
*H04B 7/08* (2006.01)
*H04W 48/18* (2009.01)

(52) U.S. Cl.
CPC ............ *H04W 76/026* (2013.01); *H04W 48/16* (2013.01); *H04B 7/0825* (2013.01); *H04W 48/18* (2013.01); *H04W 76/025* (2013.01); *H04W 88/06* (2013.01)

(58) Field of Classification Search
CPC .................................................. H04W 76/026
USPC ......................................................... 455/434
See application file for complete search history.

(56) References Cited

U.S. PATENT DOCUMENTS

| 4,759,051 A | * | 7/1988 | Han | H04B 7/2606 |
| | | | | 455/25 |
| 5,490,165 A | * | 2/1996 | Blakeney, II | H04B 1/7117 |
| | | | | 370/335 |
| 5,909,471 A | * | 6/1999 | Yun | H04L 7/042 |
| | | | | 375/343 |

(Continued)

FOREIGN PATENT DOCUMENTS

| EP | 2717634 A1 | 4/2014 |
| WO | 2006073661 A1 | 7/2006 |

OTHER PUBLICATIONS

Kottkamp, M., "Carrier Aggregation—How to test the Key Enabler for LTE Advanced", Radio-Electronics.com, May 13, 2013, pp. 1-10.

(Continued)

*Primary Examiner* — Magdi Elhag
*Assistant Examiner* — David Orange
(74) *Attorney, Agent, or Firm* — Fountainhead Law Group P.C.

(57) ABSTRACT

The present disclosure includes systems and methods for acquiring service using multiple channels. In one embodiment, the present invention includes a method comprising successively configuring a first wireless communication channel and a second wireless communication channel of a single wireless apparatus to receive a plurality of signal frequencies of one or more radio communication protocols. The first wireless communication channel is configured to receive different signal frequencies of the plurality of signal frequencies than the second wireless communication channel. The first wireless communication channel and the second wireless communication channel process the plurality of signal frequencies in parallel to establish a service connection.

10 Claims, 5 Drawing Sheets

(56) References Cited

U.S. PATENT DOCUMENTS

| | | | |
|---|---|---|---|
| 6,223,037 B1* | 4/2001 | Parkkila | H04W 36/0094 455/161.3 |
| 6,226,507 B1 | 5/2001 | Ramesh et al. | |
| 7,313,398 B1* | 12/2007 | Ramahi | H04W 24/00 370/329 |
| 7,389,113 B2 | 6/2008 | Johnston | |
| 8,325,632 B2 | 12/2012 | Gorbachov | |
| 8,326,293 B2 | 12/2012 | Reinhold et al. | |
| 8,615,233 B2 | 12/2013 | Skarp | |
| 2004/0219892 A1* | 11/2004 | Vaidyanathan | H01Q 3/2605 455/103 |
| 2008/0051134 A1 | 2/2008 | Brobston et al. | |
| 2008/0287082 A1* | 11/2008 | Govindswamy | H04B 7/0808 455/179.1 |
| 2010/0216460 A1 | 8/2010 | Wu | |
| 2011/0096739 A1* | 4/2011 | Heidari | H04W 72/085 370/329 |
| 2011/0182201 A1* | 7/2011 | Pajukoski et al. | 370/252 |
| 2011/0243119 A1 | 10/2011 | Chin et al. | |
| 2011/0255516 A1* | 10/2011 | Pawar et al. | 370/332 |
| 2012/0140743 A1* | 6/2012 | Pelletier et al. | 370/335 |
| 2012/0250612 A1* | 10/2012 | Jalloul | H04B 7/0805 370/328 |
| 2012/0302221 A1 | 11/2012 | Nader et al. | |
| 2012/0327825 A1* | 12/2012 | Gudem et al. | 370/310 |
| 2013/0100885 A1 | 4/2013 | Ngai et al. | |
| 2013/0109434 A1 | 5/2013 | Dupuy et al. | |
| 2013/0142069 A1* | 6/2013 | Xing | H04B 7/0613 370/252 |
| 2013/0337754 A1* | 12/2013 | Khlat | 455/78 |

OTHER PUBLICATIONS

International Search Report and Written Opinion—PCT/US2014/062868—ISA/EPO—Mar. 19, 2015.

* cited by examiner

SYSTEMS AND METHODS FOR ACQUIRING SERVICE USING MULTIPLE CHANNELS

BACKGROUND

The present disclosure relates to wireless systems and methods, and in particular, to systems and methods for acquiring service using multiple wireless communication channels.

Typical wireless communication systems include two systems in different locations that communicate information using radio frequency signals that propagate through the air. In order to communicate such information, the two wireless systems must establish a connection. In cellular applications, the process of establishing a connection between a wireless handset and a cellular base station is sometimes referred to as service acquisition.

Figure 1:
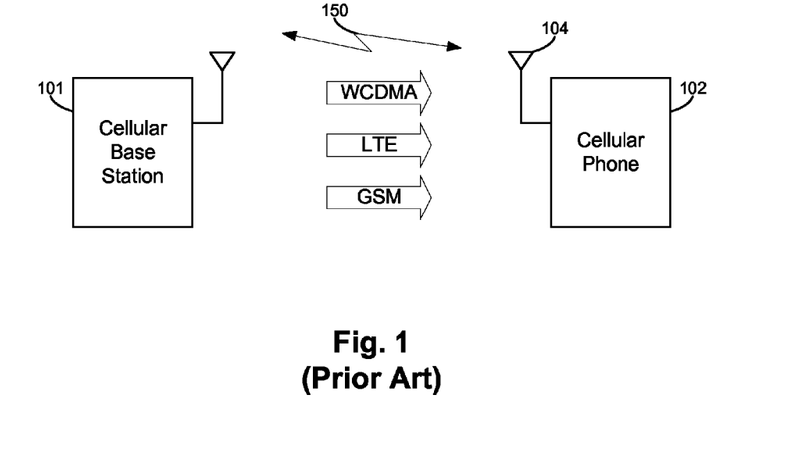
FIGS. 1-2 illustrate an existing wireless system acquiring a service connection.

FIG. 1 illustrates service acquisition between a cellular base station 101 and a cellular phone 102. Cellular base station 101 may transmit one or more radio access technologies ("RATs") (herein, "radio communication protocols"). Examples of such protocols include, but are not limited to, GSM, WCDMA, or LTE protocols. Accordingly, one or more cellular base stations in a region may transmit a variety of signal frequencies 150 corresponding to the various protocols available for a cellular phone to use to establish a service connection. When cellular phone 102 is turned on the system may initiate a service acquisition procedure by examining the signal frequencies for one or more radio communication protocols received on antenna 104.

Figure 2:
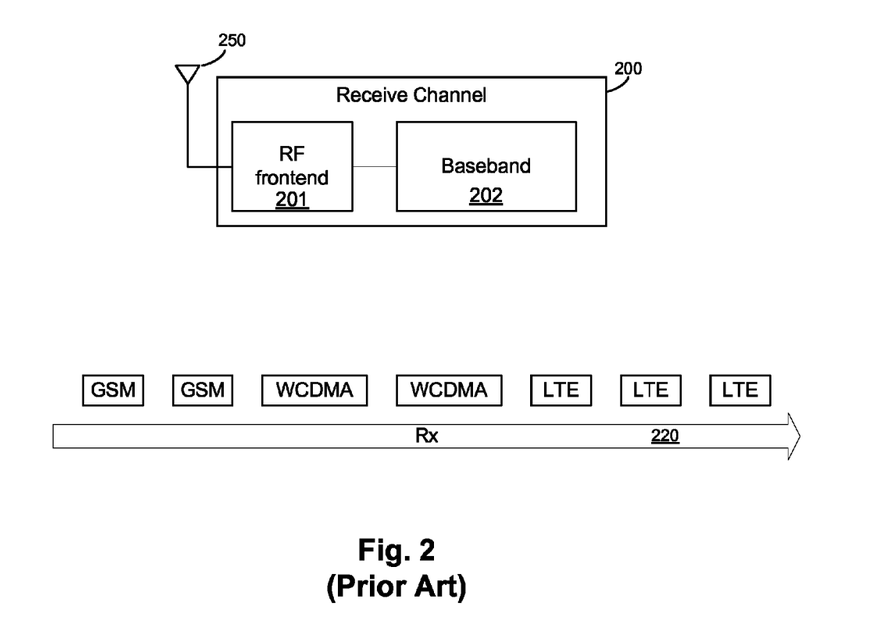

FIG. 2 illustrates a problem with existing service acquisition techniques. A receive channel 200 includes an antenna 250, RF front end 201, and baseband 202. Antenna 250 couples RF signals from the air to an input of RF frontend 201. RF frontend 201 typically includes an input amplifier, demodulator, and analog-to-digital converter to receive the RF signals and generate a digital representation of the demodulated signals, which typically include many signal frequencies configured around a carrier frequency. Baseband 202 receives digital demodulated signals (e.g., without the carrier frequency) and may analyze the received signal frequencies in an attempt to identify the presence of one of the radio communication protocols.

However, since different radio communication protocols typically use different carrier frequencies and different encodings of the signal frequencies, a wireless communication channel must be configured to receive and decipher one particular radio communication protocol at a time. As illustrated in the receive channel 220, a wireless communication channel may first be configured to receive each particular GSM band, then particular WCDMA bands, then particular LTE bands and/or other available radio communication protocols to determine if any of the radio communication protocols are available for establishing a service connection. Accordingly, existing techniques for performing service acquisition can be extremely time consuming.

SUMMARY

The present disclosure includes systems and methods for acquiring service in a wireless system. In one embodiment, the present invention includes a method comprising successively configuring a first wireless communication channel and a second wireless communication channel of a wireless apparatus to receive a plurality of signal frequencies of one or more radio communication protocols. The first wireless communication channel is configured to receive different signal frequencies of the plurality of signal frequencies than the second wireless communication channel. The first wireless communication channel and the second wireless communication channel process the plurality of signal frequencies in parallel to establish a service connection.

The following detailed description and accompanying drawings provide a better understanding of the nature and advantages of the present disclosure.

DETAILED DESCRIPTION

The present disclosure pertains to systems and methods for acquiring service in a wireless system. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 3:
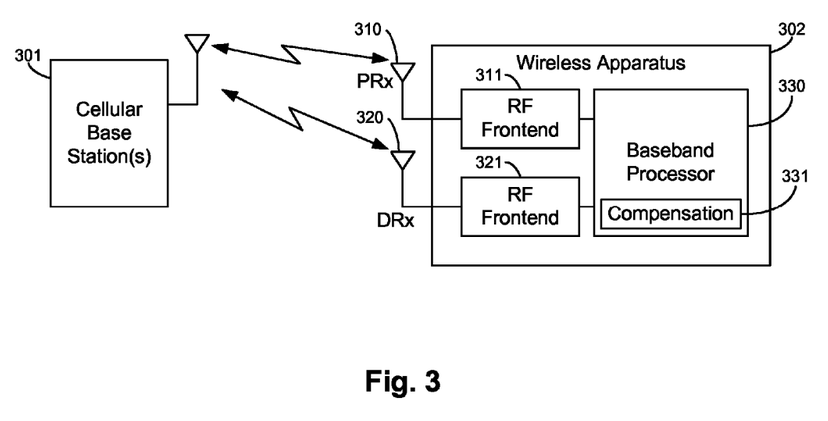
FIG. 3 illustrates wireless communication channels establishing a service connection according to one embodiment.

FIG. 3 illustrates wireless communication channels establishing a service connection according to one embodiment. Embodiments of the present disclosure include successively configuring a plurality of wireless communication channels on a single wireless apparatus 302 to simultaneously receive a plurality of signal frequencies of a radio communication protocol, such as GSM, WCDMA, or LTE, for example.

In one embodiment, a primary channel may be configured to receive one radio communications protocol (e.g., WCDMA) and a diversity channel may be configured to receive another radio communications protocol (e.g., LTE). In yet another embodiment, a primary channel may be configured to receive a particular band of a radio communications protocol (e.g., GSM) and a diversity channel may be configured to receive another band of the same radio communications protocol. In yet another embodiment, a primary channel may be configured to receive a particular signal frequency (e.g., a frequency encoded with information in a band of frequencies) for a particular radio communications protocol (e.g., GSM) and a diversity channel may be configured to receive a signal frequency of the same band of the same radio communications protocol.

In this example, wireless apparatus 302 includes two antennas 310 and 320 for a primary receive channel (PRx) and diversity receive channel (DRx). Antenna 310 is coupled to RF frontend 311, which receives RF signals and outputs digital representations of demodulated signals to a baseband processor 330. Similarly, antenna 320 is coupled to RF frontend 321, which receives RF signals and outputs digital representations of demodulated signals to a baseband processor 330. In certain embodiments, different wireless communication channels may be configured to receive different signal frequencies. In this example, RF frontend 311 and RF frontend 321 may be configured to receive different radio communication protocols, different bands of the same protocol, or different signal frequencies in the same band of the same protocol, for example. Accordingly, different wireless communication channels may process signal frequencies in parallel to reduce the time required to establish a service connection.

In one embodiment, a wireless apparatus includes a compensation component 331 (e.g., in the baseband) to compensate the wireless communication channels for different path losses. As described in more detail below, compensating may include configuring the wireless communication channels to receive the same signal frequency to produce compensation factors. The compensation factors may be applied to detected signals to compensate for different path losses between a transmitting system, such as cellular base station(s) 301, and one or more antennas, such as PRx antenna 310 and DRx antenna 320, for example. In one embodiment described in more detail below, one wireless communication channel may be used as a reference channel, and detected values for all the other wireless communication channels are adjusted to compensate for path loss differences with the reference channel, for example.

Figure 4:
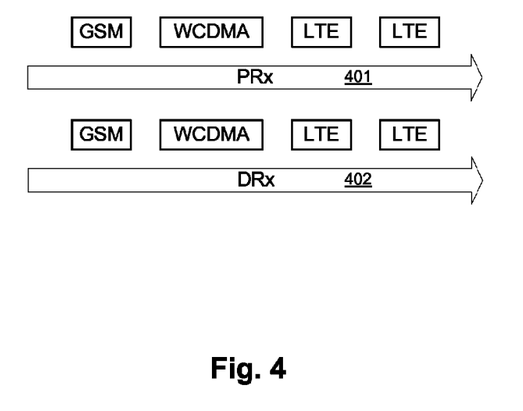
FIG. 4 illustrates performing service acquisition in parallel using multiple wireless communication channels according to one example embodiment.

FIG. 4 illustrates performing service acquisition in parallel using multiple wireless communication channels according to one example embodiment. As illustrated in FIG. 4, service acquisition of the protocols is carried out in parallel using both the PRx path 401 and the DRx path 402. Accordingly, the time to acquire service may be reduced drastically.

Figure 5:
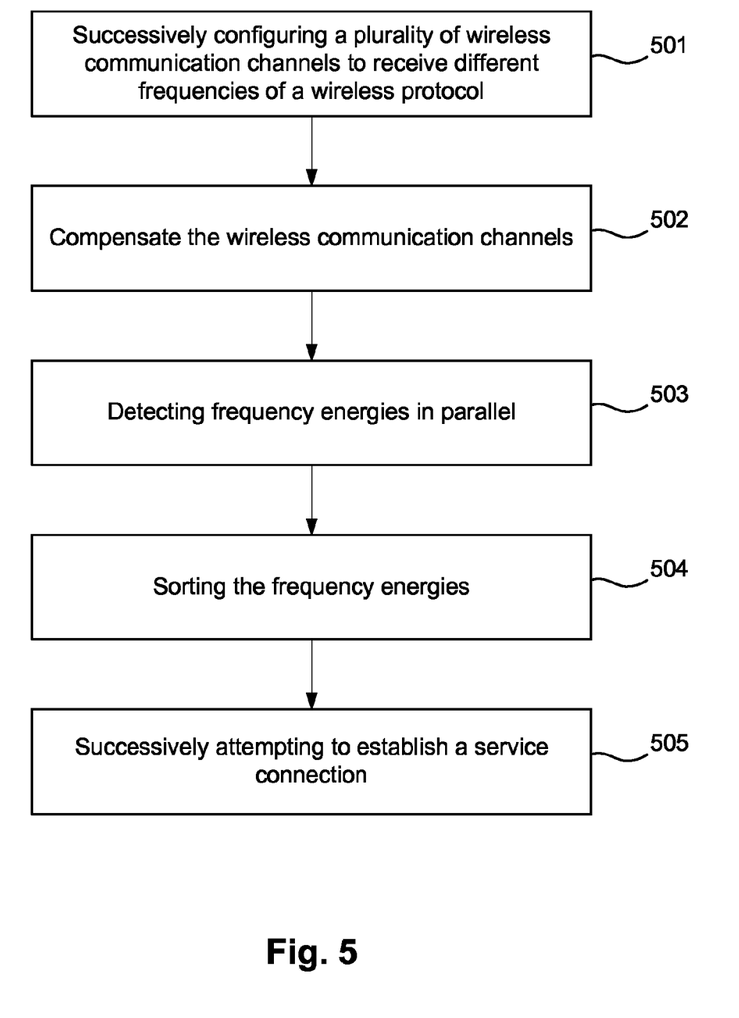
FIG. 5 illustrates a method according to one example embodiment.

FIG. 5 illustrates a method according to one example embodiment. At 501, a plurality of wireless communication channels may be successively configured to receive different signal frequencies. For example, in one embodiment, a primary channel may be configured to receive a particular signal frequency (e.g., a frequency encoded with information in a band of frequencies) for a particular radio communications protocol (e.g., GSM) and a diversity channel may be configured to receive signal frequency of the same band of the same radio communications protocol. The different channels may be successively configured to process particular signal frequencies in parallel to establish a service connection, for example.

At 502, the wireless communication channels may be compensated. For example, in one embodiment described in more detail below, the wireless communication channels are configured to receive the same signal frequency so that the system may compensate for different path losses between a transmitter and different antennas. At 503, signal frequency energies or equivalent signal values are detected in parallel. For example, in one embodiment a primary channel may detect half the frequencies in a band and a diversity channel may detect the other half of the frequencies in the band at the same time. At 504, the system may sort the detected energies (e.g., descending from strongest). At 505, the system may successively attempt to establish a service connection at each frequency starting with the signal frequency at the top of the sorted list, for example.

Figure 6:
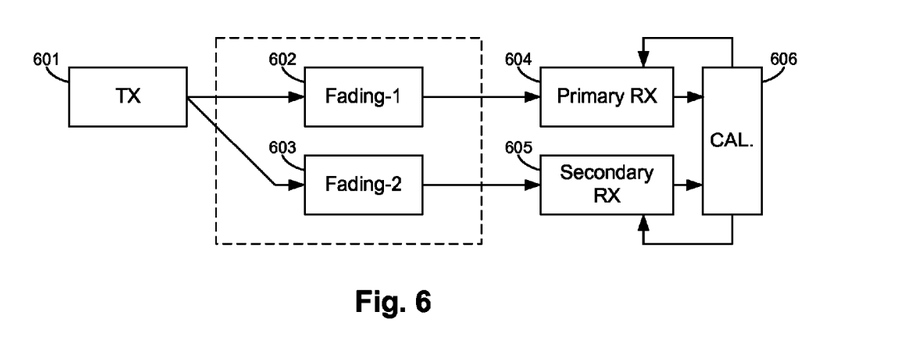
FIG. 6 illustrates compensating two channels for different path losses according to one embodiment.

FIG. 6 illustrates compensating two channels for different path losses according to one embodiment. As mentioned above, in some embodiments a wireless system may process signal frequencies in parallel on two channels and compensate the results for different path losses. In this illustrative example, a transmitter 601 transmits a signal that is received by a primary receive channel 604 and a secondary receive channel 605. However, the same signal is received by the two channels with different strengths because of the different physical locations of the two channel's antenna. Accordingly, a signal propagating from transmitter 601 to primary receive channel 604 may undergo fading 602 (e.g., a first path loss), and the same signal propagating from transmitter 601 to secondary receive channel 605 may undergo different fading 603 (e.g., a second path loss). A compensation component 606 receives the detected signal values (e.g., energy) and corrects the signal values to compensate for differences in path loss.

Figure 7:
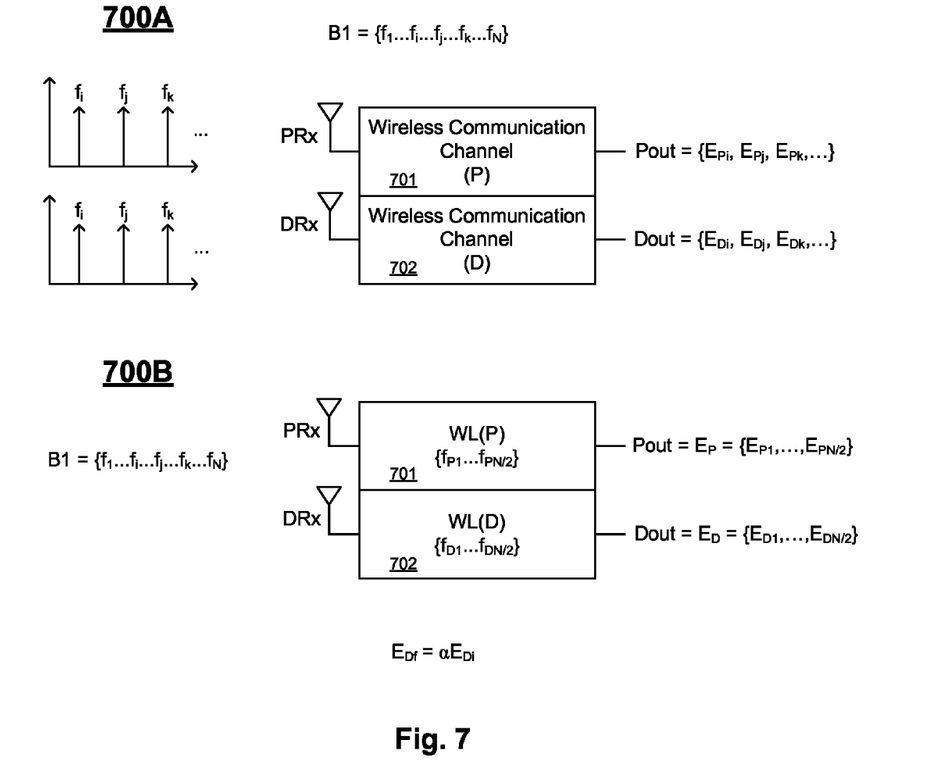
FIG. 7 illustrates compensation according to an example embodiment.

FIG. 7 illustrates compensation according to an example embodiment. In this example, a radio communication protocol may have a particular band (B1) including N frequencies f1 . . . fN. As illustrated at 700A in FIG. 7, primary wireless communication channel (P) 701 and diversity wireless communication channel (D) 702 may be configured to receive one or more of the same signal frequencies. For example, channels 701 and 702 may both be configured to receive the same one or more of the frequencies from B1. In this case, channels 701 and 702 both receive fi, fj, and fk, for example. Channel 701 may detect and produce energies for each frequency: Pout={$E_{Pi}$, $E_{Pj}$, and $E_{Pk}$} (e.g., and additional outputs if more frequencies are used). Similarly, channel 702 may detect and produce energies for each frequency: Dout={$E_{Di}$, $E_{Dj}$, and $E_{Dk}$}. A variety of techniques may be used for generating one or more compensation factors to compensate for path loss using the outputs of the different channels. In one embodiment, a difference between energy levels from two channels at the same frequency is used to produce a delta value. In this example, computing the difference between signal energy outputs of channels 701 and 702 at frequency fi produces delta_i, computing the difference between signal energy outputs of channels 701 and 702 at frequency fj produces delta_j, computing the difference between signal energy outputs of channels 701 and 702 at frequency fj produces delta_k. The deltas may be averaged to produce a single compensation factor α, for example.

As illustrated at 700B in FIG. 7, channels 701 and 702 may be configured to receive different signal frequencies in band B1 of a radio communication protocol. For example, channel 701 may receive half of the signal frequencies $f_{P1}$ . . . $f_{PN/2}$ and channel 702 may receive the other half of the signal frequencies $f_{D1}$ . . . $f_{DN/2}$. Accordingly, channel 701 outputs Pout={$E_{P1i}$, . . . , $E_{PN/2}$} and channel 702 outputs Dout={$E_{D1i}$, . . . , $E_{DN/2}$}. Each of the detected energy values may be compensated for path loss. For example, compensation factor, α, represents a difference in path loss between channel 701 and 702. Accordingly, each energy value from the diversity channel 702 may be compensated by multiplying the energy value by compensation factor, α (e.g., a final value, $E_{Df}$ equals an initial value $E_{Di}$ times the compensation factor). Accordingly, the signal frequencies received and detected by channel 702 may be compensated for the different path loss during the service acquisition procedure. In one embodiment described in more detail below, one or more of the detected energy levels for the same signal frequencies are signal frequencies in the radio communication protocol (e.g., fi, fj, or fk) so that the energy levels for these signals determined during compensation may be saved, compensated for, and used in the service acquisition process. Thus, any signal frequencies detected during compensation in 700A can be removed from the signal acquisition process of 700B to further reduce the time of service acquisition.

Figure 8:
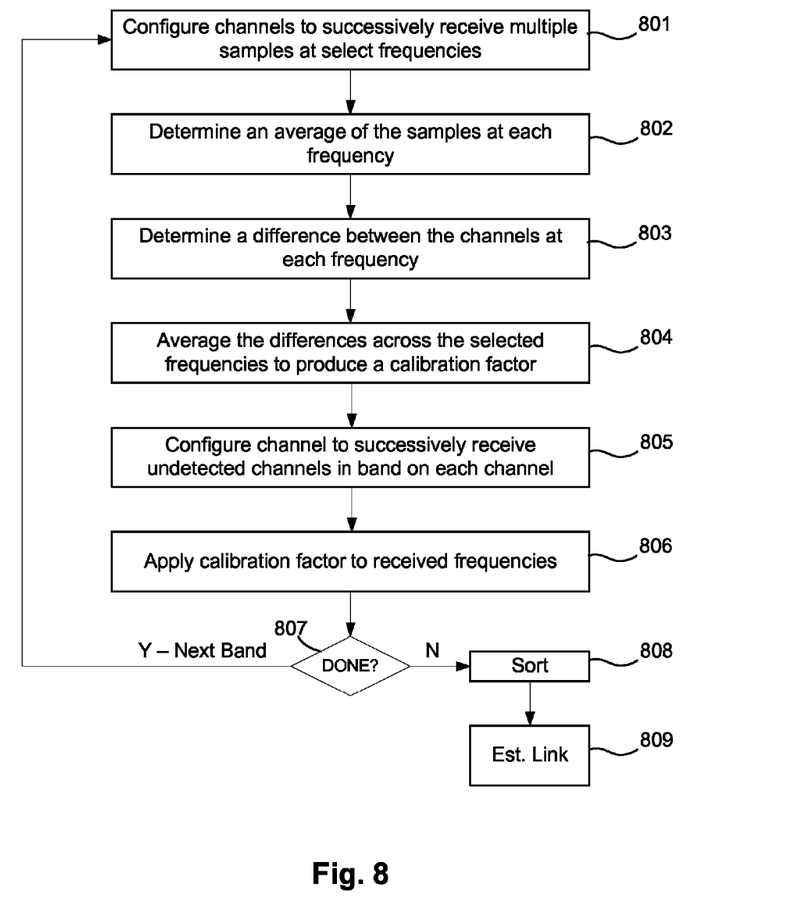
FIG. 8 illustrates an example service acquisition process according to another embodiment.

FIG. 8 illustrates an example service acquisition process according to another embodiment. In one embodiment, multiple channels may be configured to receive and sample the same frequency as part of the compensation procedure. At 801, multiple wireless communication channels are configured to successively receive multiple samples at one or more selected frequencies. At 802, an average of the samples is determined at each frequency (e.g., an average of sample at frequency fi, fj, and fk at 700A in FIG. 7). At 803, a difference between outputs from the channels at each frequency is determined. For example, as mentioned above, a difference between an average value of samples for frequency fk from channel 701 and an average value of samples for frequency fk from channel 702 may be determined to generate one "delta" (or "difference") value. At 804, the system may produce an average of the difference values across the selected frequencies to produce a compensation factor, for example. At 805, the wireless communication channels are configured to successively receive undetected channels in a band. As mentioned above, since energies for some of the frequencies in the band were determined during compensation, it may be unnecessary to determine energy levels for these frequencies again. At 806, the compensation factor is applied to detected energy levels for the received frequencies. In one example embodiment, detected energy levels from one wireless communication channel are unchanged and detected energy levels from other wireless communication channels are multiplied by a compensation factor. At 807, the system determines if other bands of the current radio communication protocol or other radio communication protocols are to be examined as part of the service acquisition process. If more bands are to be analyzed, then the process returns to 801. If the process is complete, then the energy values produced by each wireless communication channel are sorted at 808. At 809, the system is configured to establish communication with the frequencies in the sorted list.

EXAMPLE

Aspects of the present disclosure are further understood using the following illustrative example. The specific numbers and details are to be understood as instructive, but not limiting, of the concepts and embodiments described above.

Advantages of service acquisition using some of the above described techniques may be shown by considering a search of R-GSM 900. R-GSM 900 includes the following channels: 955-1023, 0-124 (i.e., total number of channels=194). Accordingly, a wireless apparatus may be required to scan 194 channels during a service acquisition procedure. In this example, Band 1 may include frequencies {f1 ... f194}, and frequencies {f1 ... f97} may be received by a primary receive channel (PRx) and frequencies {f98 ... f194} may be received by a secondary (or diversity) receive channel (DRx) on the wireless apparatus. The outputs of the PRx and DRx channels are received energy levels at each frequency as follows:
$R^{PRX}$={Rxf1 ... Rxf97}—received signal energies from primary channel;
$R^{DRX}$={Rxf98 ... Rxf194}—received signal energies from diversity channel.
However, due to path loss differences mentioned above, there may be more attenuation in the transmission path between the transmitter antenna and the two different receiver antennas for each channel, causing all the received energy levels to be lower for one channel than the other. For example, if a 20 dBm signal is transmitted, but the path loss to the primary channel antenna is −95 dBm and the path loss to the diversity channel antenna is −100 dBm, then the diversity channel energy levels for each frequency will be −5 dBm lower than the primary channel energy levels (e.g., PRx=+20 dBm−95 dBm=−75 dBm and DRx=+20 dBm−100 dBm=−80 dBm). This 5 dBm imbalance should be compensated to accurately compare signal energies of the frequencies received by each channel, for example. In some applications, changes in path loss within about 1 second may be negligible, so an entire band (e.g., f1 ... f194) may be compensated once for service acquisition purposes.

The following is one example algorithm for performing the compensation.
0: k=1;
1: Select 10 channels per band separated by approximately the same frequency (e.g., f(x)={f20, f40, f60, f80, ..., f180, f190}
2: Configure PRx→f(k); f(1)=f20, f(2)=f40, ..., f(10)=f190
3: Configure DRx→f(k); f(1)=f20, f(2)=f40, ..., f(10)=f190
//both channels receive same signal frequencies.
4: Sample 5 times per channel;
//PRx_f(k)=[s1, s2, s3, s4, s5];
//DRx_f(k)=[s1', s2', s3', s4', s5'];
5: Average samples on each channel
//PRx[k]=mean(PRx_f(k)); (e.g., PRx[1]=mean(s1 ... s5))
//DRx[k]=mean(DRx_f(k))
6: Take the difference at each frequency
//delta[k]=PRx[k]−DRx[k]
7: Increment; k=k+1
8: If k>10 goto step 10
9: Goto step 2
10: Average delta values across all 10 frequencies
// Compensation factor α=mean(delta[k]; k=1 ... 10)
11: PRx[k]=DRx[k]−α; for all k
12: Successively configure PRx and DRx to remaining 184 frequencies (e.g., 194 total
frequencies minus 10 frequencies already completed)
// Configure PRx to {f1 ... f82}
// Configure DRx to {f83 ... f184}
13: Measure energy at each frequency in parallel
//PRx={E1, ..., E82}
//DRx={E83, ..., E184}
14: Compensate-PRx=DRx−α
15: Store energy values in list
16: Sort list
17: Perform service acquisition search from top of list.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:
1. A method comprising:
on a single wireless apparatus, configuring a primary receiver having an input coupled to a primary antenna and a diversity receiver having an input coupled to a diversity antenna to process a plurality of different radio communication protocols received on the primary receiver and the diversity receiver to establish a service connection, said processing comprising, for each radio communication protocol:
generating compensation factors, the compensation factors corresponding to detected energy levels for a first plurality of signal frequencies of a first radio communication protocol of the plurality of different radio communication protocols, wherein generating the compensation factors comprises,
  re-configuring the primary receiver and the diversity receiver to simultaneously receive one or more external RF signals having the same frequency, and
  detecting each of the external RF signals having the same frequency to produce one or more first detected energy levels for the primary receiver and one or more second detected energy levels for the diversity receiver;
configuring the primary receiver and the diversity receiver of the single wireless apparatus to simultaneously receive a second plurality of signal frequencies of the first radio communication protocol, wherein the primary receiver is configured to receive different signal frequencies of the second plurality of signal frequencies than the diversity receiver;
detecting a plurality of third energy levels of the second plurality of signal frequencies received at the primary receiver and the diversity receiver;
modifying the third detected energy levels from one of the primary receiver or the diversity receiver for different path losses based on a difference between the first detected energy levels and the second detected energy levels to produce compensated energy levels; and
establishing the service connection based on the compensated energy levels using one of
the compensated energy levels from the primary receiver and the third detected energy levels from the diversity receiver, or
the compensated energy levels from the diversity receiver and the third detected energy levels from the primary receiver.

2. The method of claim 1 wherein successively configuring comprises:
configuring the primary receiver to receive a first signal frequency of the second plurality of signal frequencies;
configuring the diversity receiver to receive a second signal frequency of the second plurality of signal frequencies, wherein the second signal frequency is different than the first signal frequency;
simultaneously processing the first signal frequency in the primary receiver and the second signal frequency in the diversity receiver;
performing the configuring the primary receiver step for a first portion of signal frequencies of the second plurality of signal frequencies, performing the configuring the diversity receiver step for a second portion of signal frequencies of the second plurality of signal frequencies, and repeating the simultaneously processing step for each of the first and second portion of frequencies.

3. The method of claim 1 wherein detecting each of the external RF signals having the same frequency comprises:
sampling each of the signals having the same frequency in the primary receiver and the diversity receiver to produce a first plurality of samples in the primary receiver and a second plurality of samples in the diversity receiver; and
generating averages of the first plurality of samples and the second plurality of samples for each of the signals having the same frequency.

4. The method of claim 1 wherein the primary receiver processes a first band of the first radio communication protocol and the diversity receiver processes a second band of the first radio communication protocol.

5. The method of claim 1 wherein the first plurality of signal frequencies are different than the second plurality of signal frequencies and wherein the first and second pluralities of signal frequencies are a plurality of channels in a single frequency band.

6. The method of claim 5 wherein the plurality of channels comprise all the channels of the single frequency band.

7. The method of claim 1 further comprising storing the compensated energy levels from the one of the primary receiver or the diversity receiver and the third detected energy levels from the other one of the primary receiver or the diversity receiver in a ranked list, wherein establishing the service connection comprises searching from the top of the list.

8. The method of claim 1 wherein the primary receiver and the diversity receiver comprise a single baseband processor configured to process the plurality of different radio communication protocols.

9. An apparatus comprising:
a primary receiver having an input coupled to a primary antenna;
a diversity receiver having an input coupled to a diversity antenna, wherein the primary receiver and the diversity receiver are part of a single wireless apparatus; and
a processor,
wherein the primary receiver and the diversity receiver are configured to process a plurality of different radio communication protocols received on the primary receiver and the diversity receiver to establish a service connection, said processing comprising, for each radio communication protocol:
  generating compensation factors, the compensation factors corresponding to detected energy levels for a first plurality of signal frequencies of a first radio communication protocol of the plurality of different radio communication protocols, wherein generating the compensation factors comprises,
    re-configuring the primary receiver and the diversity receiver to simultaneously receive one or more external RF signals having the same frequency, and
    detecting each of the external RF signals having the same frequency to produce one or more first detected energy levels for the primary receiver and one or more second detected energy levels for the diversity receiver;
  configuring the primary receiver and the diversity receiver of the single wireless apparatus to simultaneously receive a second plurality of signal frequencies of the first radio communication protocol, wherein the primary receiver is configured to receive different signal frequencies of the second plurality of signal frequencies than the diversity receiver;
  detecting a plurality of third energy levels of the second plurality of signal frequencies received at the primary receiver and the diversity receiver;
  modifying the third detected energy levels from one of the primary receiver or the diversity receiver for different path losses based on a difference between the first detected energy levels and the second detected energy levels to produce compensated energy levels; and
  establishing the service connection based on the compensated energy levels using one of
    the compensated energy levels from the primary receiver and the third detected energy levels from the diversity receiver, or the compensation energy levels from the diversity receiver and the third detected energy levels from the primary receiver.

10. The apparatus of claim 9 wherein the processor is configured to:
configure the primary receiver and the diversity receiver to sample each of the signals having the same frequency in the primary receiver and the diversity receiver to produce a first plurality of samples in the primary receiver and a second plurality of samples in the diversity receiver; and
generate averages of the first plurality of samples and the second plurality of samples at each of the signals having the same frequency.

* * * * *